United States Patent
Mackel et al.

(10) Patent No.: US 10,865,880 B2
(45) Date of Patent: Dec. 15, 2020

(54) SEAL ARRANGEMENT FOR SEALING A GAP

(71) Applicant: GEA MECHANICAL EQUIPMENT GMBH, Oelde (DE)

(72) Inventors: Wilfried Mackel, Lippetal-Herzfeld (DE); Thomas Kleimann, Oelde (DE)

(73) Assignee: GEA MECHANICAL EQUIPMENT GMBH, Oelde (DE)

( * ) Notice: Subject to any disclaimer, the term of this patent is extended or adjusted under 35 U.S.C. 154(b) by 371 days.

(21) Appl. No.: 16/078,891

(22) PCT Filed: Mar. 15, 2017

(86) PCT No.: PCT/EP2017/056171
§ 371 (c)(1),
(2) Date: Aug. 22, 2018

(87) PCT Pub. No.: WO2017/158057
PCT Pub. Date: Sep. 21, 2017

(65) Prior Publication Data
US 2019/0049015 A1    Feb. 14, 2019

(30) Foreign Application Priority Data
Mar. 18, 2016    (DE) .......................... 10 2016 105 047

(51) Int. Cl.
*F16J 15/02*    (2006.01)
*F16J 15/06*    (2006.01)
*F16J 15/10*    (2006.01)

(52) U.S. Cl.
CPC ........... *F16J 15/025* (2013.01); *F16J 15/061* (2013.01); *F16J 15/062* (2013.01); *F16J 15/106* (2013.01)

(58) Field of Classification Search
CPC .. F16J 15/02; F16J 15/062; F16J 15/10; F16J 15/102; F16J 15/104
See application file for complete search history.

(56) References Cited

U.S. PATENT DOCUMENTS

| | | | | |
|---|---|---|---|---|
| 4,192,520 A | * | 3/1980 | Hasegawa | F02F 7/006 277/591 |
| 4,934,715 A | * | 6/1990 | Johnson | E02D 29/14 220/378 |
| 10,473,218 B2 | * | 11/2019 | Dore | F16J 15/061 |

FOREIGN PATENT DOCUMENTS

| | | |
|---|---|---|
| DE | 3815511 A1 | 11/1989 |
| DE | 102011081973 A1 * | 3/2013 ............. F16J 15/106 |

(Continued)

OTHER PUBLICATIONS

International Search Report dated May 16, 2017 in related International Application No. PCT/EP2017/056171.

(Continued)

*Primary Examiner* — Vishal A Patel
(74) *Attorney, Agent, or Firm* — Patent Portfolio Builders PLLC

(57) ABSTRACT

A seal arrangement for a process device or installation. A component arrangement has two components adjoining one another in sections in the area of a gap. A groove toward the gap is formed on one of the two components, which groove is L-shaped and is open toward an edge of the gap. A seal is inserted into the groove, which seal also has an L shape that corresponds to the L shape of the groove, for which purpose the seal has a first sealing limb and a second sealing limb at right angle thereto. The first sealing limb is designed so that the first sealing limb is inserted into the first limb of the groove, and the second sealing limb is designed in such a way that the second sealing limb can be inserted into the second limb of the groove and is firmly clamped there, and (Continued)

the first sealing limb is firmly clamped into the first limb of the groove in the manner of a sealing foot with oversize.

7 Claims, 4 Drawing Sheets

(56) References Cited

FOREIGN PATENT DOCUMENTS

| | | |
|---|---|---|
| DE | 102011081973 A1 | 3/2013 |
| JP | 2013044379 A | 3/2013 |

OTHER PUBLICATIONS

Search Report dated Oct. 18, 2016 in related DE Application No. 10 2016 105 047.4.
Written Opinion dated May 16, 2017 in related International Application No. PCT/EP2017/056171.

* cited by examiner

SEAL ARRANGEMENT FOR SEALING A GAP

BACKGROUND AND SUMMARY OF THE INVENTION

Exemplary embodiments of the invention relate to a seal arrangement for sealing a gap.

The prior art—such as DE 10 2011 081 973 A1—discloses sealing gaps between two adjoining components with an L-shaped seal, which engages with a foot region in an L-shaped groove in the first of the two components that bound the gap, wherein a sealing face extends in a manner protruding beyond the groove, the sealing face bearing against the other, second component on the opposite side of the gap. This seal is constructed in a relatively complicated manner and requires a groove, to be produced in a structurally complicated manner, with a special protrusion extending into the groove, this also entailing the risk of dirt building up easily in the groove.

In process engineering, when sealing the peripheral region of a gap between two components, not only is the sealing function important but also a design and configuration such that fewer deposits build up at the gap and at the seal and such that there is also a good possibility of cleaning regions of the seal that are exposed at the gap.

In the scope of the present invention, a seal arrangement and a seal are disclosed, each meeting these requirements well, i.e., the seal is intended to readily fulfill its sealing function and also to be designed such that soiled corners or gaps in which deposits build up form as little as possible. This is a demand, frequently made in process plants, for improving the cleanability, sterilization or disinfection of all components that come into contact with product.

According to an embodiment, a seal arrangement for a process device or plant, having a component arrangement with two components that sectionally adjoin one another in the region of a gap, wherein a groove is formed on one of the two components in the direction of the gap, the groove being formed in an L-shaped manner and being open toward an edge of the gap, wherein a first groove limb of the groove extends perpendicularly to the plane of the gap, and wherein a further groove limb is oriented perpendicularly to the first groove limb, which is formed so as to be open toward the space, wherein a seal has been inserted into the groove, the seal likewise having an L-shape, corresponding to the L-shape of the groove, to which end it has a first sealing limb and a second sealing limb perpendicular thereto, wherein the first sealing limb is designed such that it is inserted into the first groove limb, and the second sealing limb is designed such that it is insertable into the second groove limb and clamped tightly there, wherein, in the non-inserted state, the seal has an oversize relative to the dimensions of the groove and is inserted into the groove as such and tightly clamped therein. Furthermore, the first sealing limb has, in a state in which it is not inserted into the first longitudinal limb of the groove, an oversize with respect to the groove in the region of a sealing foot, in particular has an oversize perpendicular to the first longitudinal limb of the groove, wherein in each case one channel extending perpendicularly to the seal cross-section along the respective wall of the groove is formed at least on three outer faces of the first sealing limb that face the walls of the groove in the inserted and compressed state of the seal in the groove, and these one or more channels are dimensioned such that, even in the state in which the sealing foot has been inserted into the groove limb, in the region of the channel a spacing still exists in each case between the seal and the respectively associated inner wall of the groove, wherein at least two of these channels are formed in the region of the first longitudinal limb and extend approximately centrally in the region of the respective groove wall of this longitudinal limb, and wherein, above the sealing foot, a sealing region is formed which has a peripheral face facing the gap edge, wherein the peripheral face is designed such that a substantially planar transition is formed between the peripheral faces of the components, which extend at an angle to the gap plane, and the peripheral face.

Preferably, even in the state in which the sealing foot has been inserted into the groove limb, in each case in the region of the channel a spacing >0.1 mm still exists in each case between the seal, or the sealing foot thereof, and the respectively associated inner wall of the groove.

The channels—in particular also the two channels in the first longitudinal limb that are provided centrally in the groove wall—afford plentiful space for the necessary deformation of the seal during insertion into the groove. They also arise easily in the non-inserted state on account of the specified oversize of the foot of the seal. The seal is thus able to be fitted very easily in the groove and yet sits in the groove in a tightly clamped manner in the inserted state.

Overall, as a result of the seal arrangement according to the invention having the seal, inserted into the gap in the associated component arrangement having two components, the seal is anchored securely in the groove of one component at the gap, without special structural measures needing to be taken on the groove. The term "oversize" in the context of this document means that the width of the seal in the corresponding region with an oversize is larger by the amount of the oversize in the non-inserted state than the corresponding width of the groove or the corresponding spacing of opposite groove walls of the groove in this region. The oversize is at least 1 mm, preferably more than 2 mm.

In addition, according to the further variant (and also option), an exposed peripheral face of the seal, which faces the gap edge, is aligned well with the adjoining walls of the two components. The formation of soiled corners or gaps in this region is avoided. It is not very susceptible to caking and can be cleaned readily.

Preferably, an abutment of the associated seal outer face against the associated inner wall of the groove exists on both sides of each of the channels, such that, at each of the seal outer faces, in each case two abutment regions with the corresponding component are formed, thereby improving the fit of the seal and optimizing the sealing action.

In addition, toward the other component, at least two parallel sealing lines or sealing portions are preferably formed on the sealing face. In addition, one or two fixed, defined abutment regions with the groove walls are in each case formed toward all sides in the groove.

Also disclosed is an advantageous seal arrangement for a process device or plant, having a component arrangement with two components that sectionally adjoin one another in the region of a gap, wherein a groove is formed on one of the two components in the direction of the gap, the groove being formed in an L-shaped manner and being open toward an edge of the gap, wherein a first groove limb of the groove extends perpendicularly to the plane of the gap, and wherein a further groove limb is oriented perpendicularly to the first groove limb, which is formed so as to be open toward the space, wherein a seal has been inserted into the groove, the seal likewise having an L-shape, corresponding to the L-shape of the groove, to which end it has a first sealing limb and a second sealing limb perpendicular thereto, wherein the first sealing limb is designed such that it is inserted into the first groove limb, and the second sealing limb is designed such that it is insertable into the second groove limb and clamped tightly there, and wherein the first sealing limb is tightly clamped in the manner of a sealing foot with an oversize in the first groove limb, wherein in each case one channel extending perpendicularly to the seal cross-section is formed at least on one, on two or on three outer faces of the first sealing limb that face the walls of the groove, and these one or more channels are dimensioned such that, even in the state in which the sealing foot has been inserted into the groove limb, in the region of the channel a spacing still exists in each case between the seal and the respectively associated inner wall of the groove, and/or wherein, above the sealing foot, a sealing region is formed which has a peripheral face facing the gap edge, wherein the peripheral face is designed such that a substantially planar transition is formed between the peripheral faces of the components, which extend at an angle to the gap plane, and the peripheral face.

BRIEF DESCRIPTION OF THE DRAWING FIGURES

In the following text, the invention will be described in more detail on the basis of exemplary embodiments with reference to the drawing, wherein further advantageous, optional features of the invention are also discussed. In the drawing.

DETAILED DESCRIPTION

Figure 2:
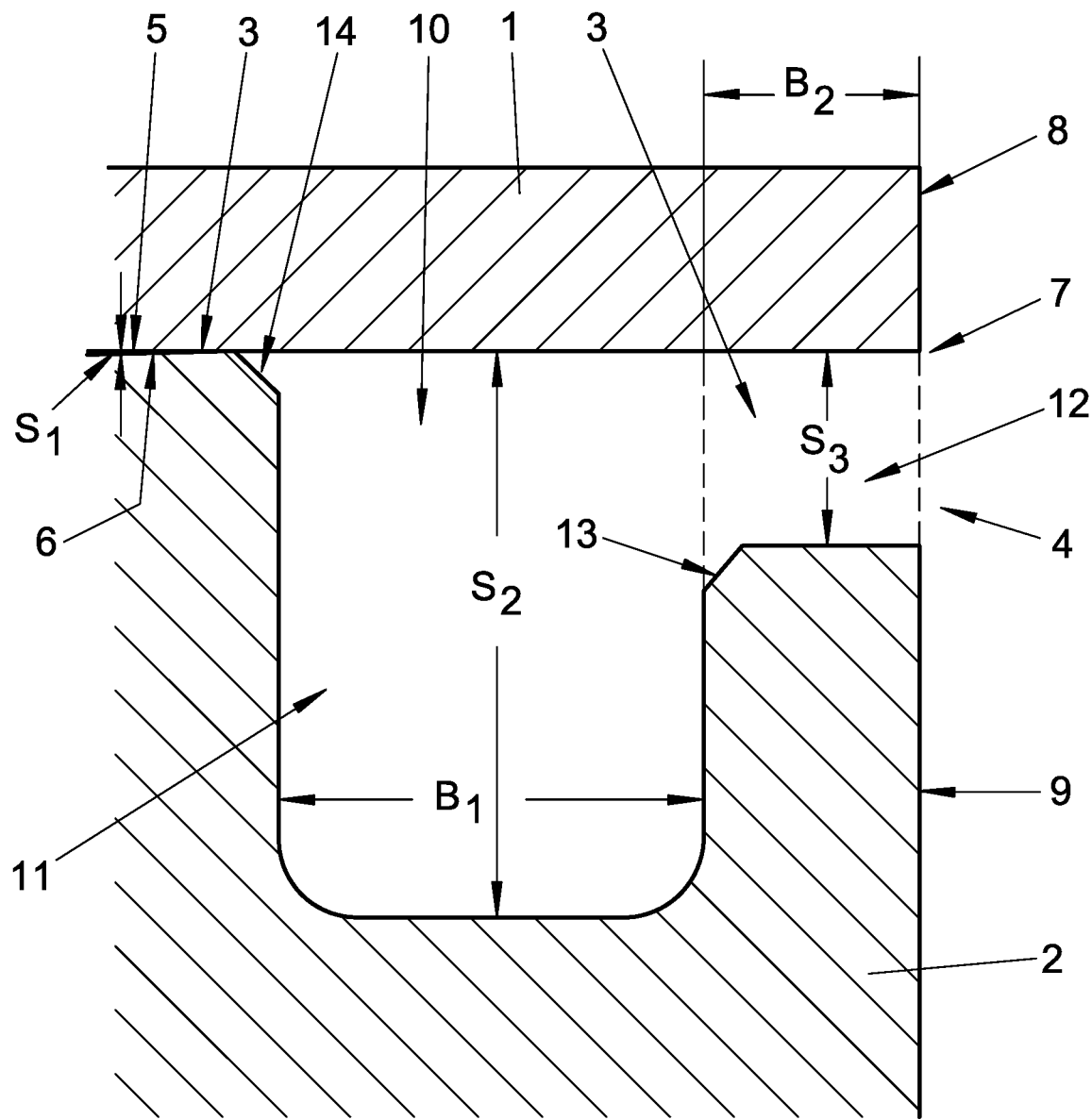
FIG. 2 shows a section through a component arrangement of the seal arrangement in FIG. 1.

FIG. 2 shows a section through a portion of a component arrangement having two adjoining components 1, 2, between which a gap 3 is formed.

This component arrangement is a part of process equipment or a process plant that is not otherwise illustrated here. Thus, the adjoining components 1, 2 can be, purely by way of example, two pipe flanges or a container and a lid or, for example, two elements, for example flanges, on parts of a centrifuge.

What is intended to be sealed is the peripheral region of the gap 3 between the two adjoining components 1, 2. The two components 1, 2 are configured in this peripheral region such that the gap 3 widens to form a larger space 4. This space 4 can be for example the interior of a container, of a pipe or of a drum.

The two components 1, 2 adjoin the gap 3 in each case with boundary faces 5 and 6, respectively, resting against one another. The gap depth S1 is in this case=0. At the edge 7 of the gap 3, further faces—referred to in the following text as peripheral faces 8, 9—of the components 1, 2 extend away from one another, in this case perpendicularly away from one another.

One of the components 1, 2—in this case the lower component 2, for example, in the drawing—has a groove 10 in the transition region between the boundary face 6 and the peripheral face 9. The groove 10 is formed in an approximately L-shaped manner here and is open toward the edge 7 or toward the space 4. A first groove limb 11 of the groove 10 extends into the component 2 in an approximately U-shaped manner perpendicularly to the plane of the gap 3. The first groove limb 11 has a groove-limb depth S2 perpendicular to the gap. A further, second groove limb 12 is oriented perpendicularly to the first groove limb 11. It extends less deeply into the component 2, with a groove-limb depth S3, perpendicularly to the boundary face 6 than the first groove limb 11 and is open toward the space 4, such that, in the gap 3, toward the edge or space, the components 1, 2 do not rest directly on one another but are at a spacing from one another with the groove-limb depth S3.

This means that the gap depth S1 and the groove-limb depths S2 and S3 of the gap 3 perpendicularly to the gap plane 3 are configured as follows:

$$S1 < S3 < S2.$$

Preferably: S1=0 mm and S3<=½ S2.

Parallel to the gap, the first groove limb 11 has a groove-limb width B1 and the second groove limb 12 has a groove-limb width B2.

In order to create a highly stable seal profile, the following preferably applies: B1≥B2.

In the transition region (corner region) between the two groove limbs 11, 12, a bevel (chamfer 13) can be formed. In the transition region (corner region) between the first groove limb 11 and the peripheral region 6, a further bevel (chamfer 14) can be formed. In the groove bottom of the groove limb 11, the corner regions can have a production radius or be formed in a rounded manner.

Figure 3:
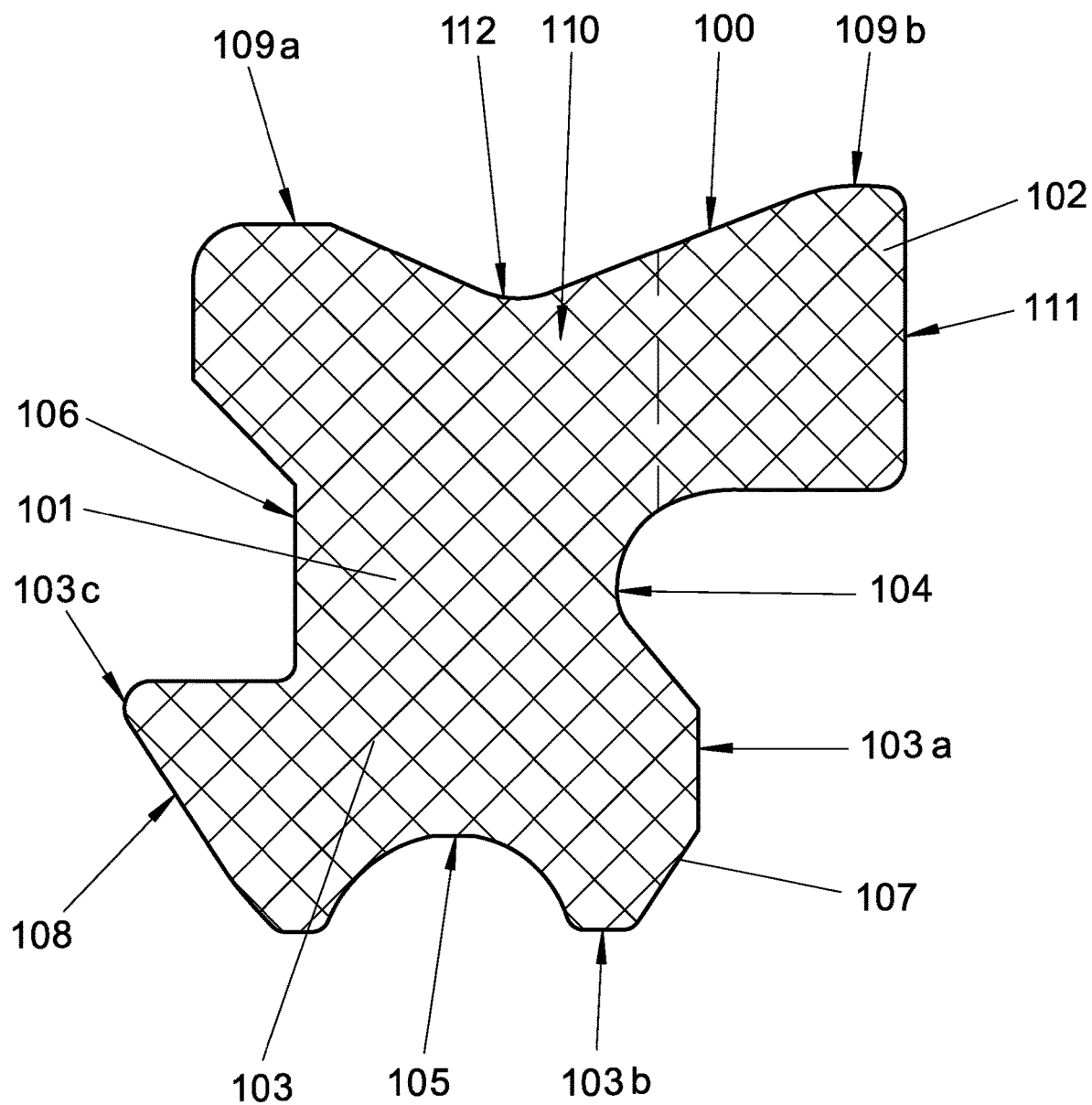
FIG. 3 shows a cross-sectional view of the seal in FIG. 1.

In order to seal the gap 3 of the component arrangement in FIG. 2, the seal 100 in FIG. 3 is used. Elastomers are preferably used as the material for or of the seal 100. Preferably, those elastomers are selected that meet process, sanitary and hygiene demands in the fields of food technology, pharmaceutics, chemistry or biotechnology. The seal is furthermore intended to be designed so as to be deformable preferably not plastically but rather substantially elastically.

Figure 1:
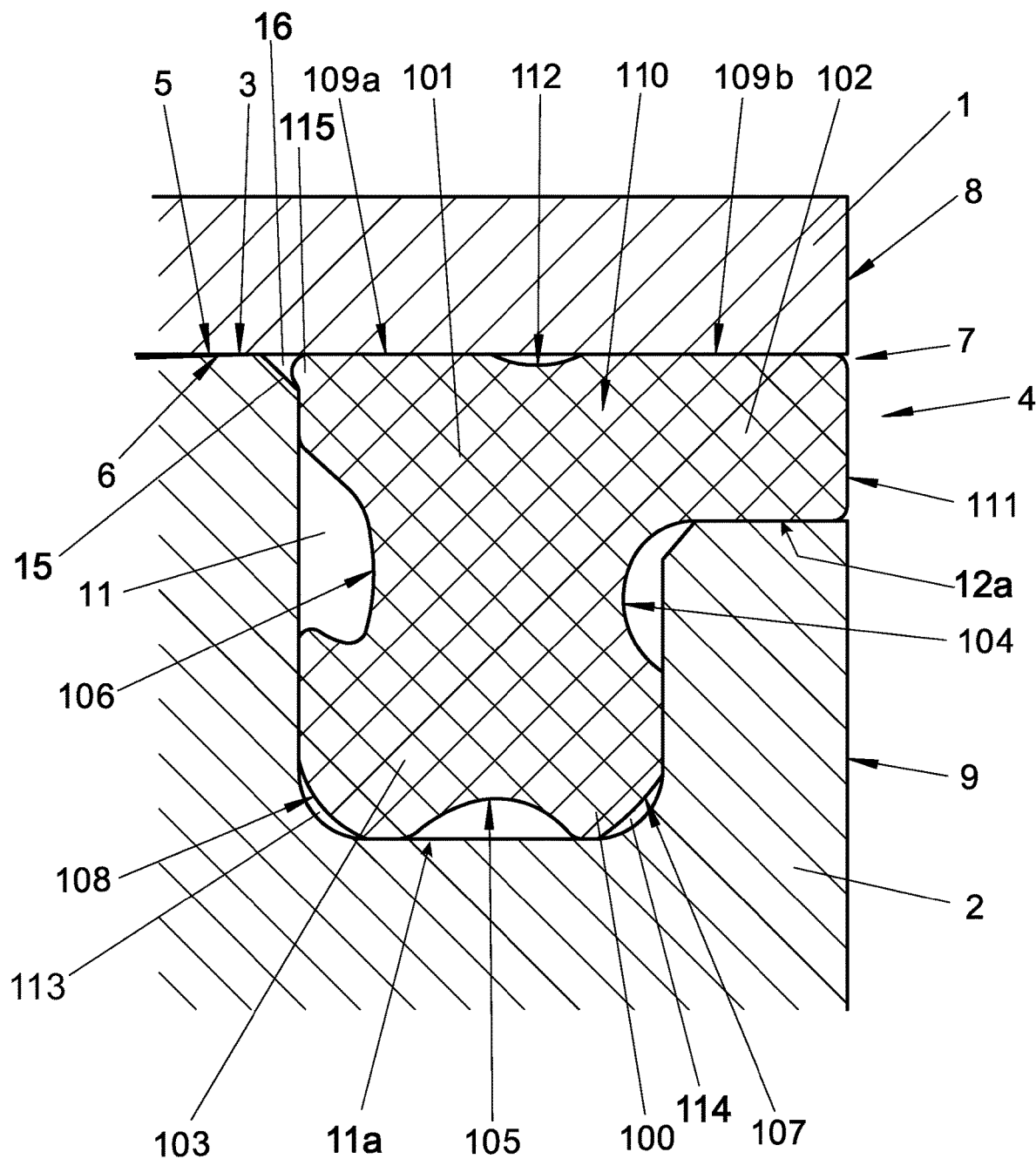
FIG. 1 shows a sectional view of a seal arrangement having a component arrangement and a seal.
Figure 4:
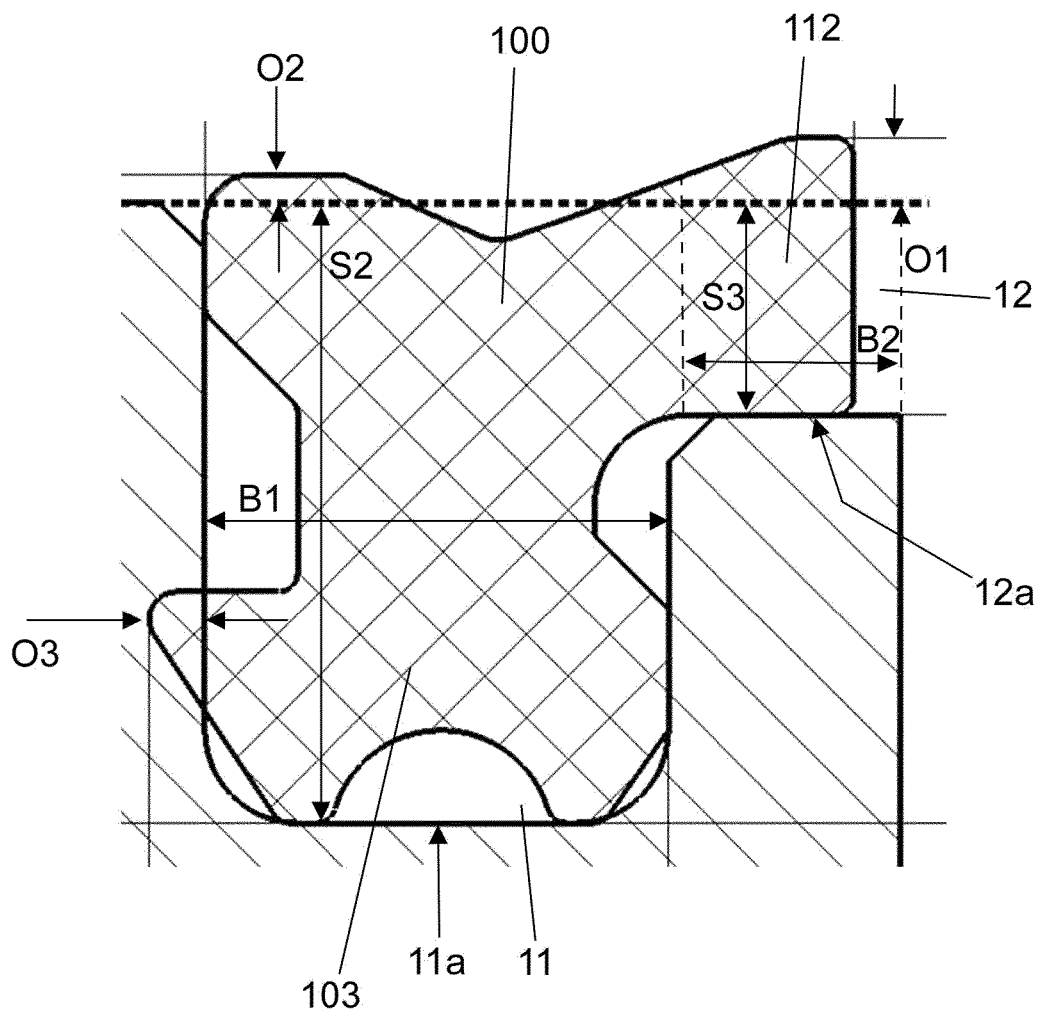
FIG. 4 shows a sectional view of a seal arrangement having a component of a component arrangement and a seal, wherein the seal has been drawn in an undeformed state.

FIG. 4 shows a sectional view of a seal arrangement having a component 2 of a component arrangement (and a theoretical boundary face 5, indicated by a dashed line, with the component 1 in FIG. 1) and a seal 100, wherein the seal 100 has been indicated in an undeformed state and overlaid over the cross-section. This does not correspond to any actual state. In this regard, FIG. 4 serves more for illustration in order, compared with FIG. 1, to elucidate the regions in which the seal 100 has been compressed upon insertion into the component arrangement in order to realize the state in FIG. 1.

The seal 100 has substantially—in the uncompressed but also in the compressed state—an L shape, which corresponds substantially to the L shape of the groove 10. This means that the seal 100 has a first sealing limb 101 (to the left of the dashed line in FIG. 3) and a sealing limb 102 perpendicular thereto (to the right of the dashed line). As can be seen in FIG. 1, the first sealing limb 101 is designed such that it is insertable into the first groove limb 11 with a lower foot region 103, such that it is tightly clamped there in the inserted state. The second sealing limb 102 is furthermore designed such that it is insertable into the first groove limb 12 and is tightly clamped there in the gap 3 between the two components 1 and 2.

The first sealing limb and the second sealing limb 101, 102 each have regions in which they have an oversize O1, O2, O3 relative to the groove sizes in the state not yet inserted into the groove, such that the seal 100 sits well in the gap 3 and such that the gap 3 is sealed well in the region of the groove 10, and regions in which they also exhibit a spacing from the adjacent/adjoining inner wall of the groove 10 in the state inserted into the groove 10. The term "oversize" means that the width of the seal 100 in the corresponding region with an oversize is larger by the amount of the oversize in the non-inserted state than the corresponding width of the groove or the corresponding spacing of opposite groove walls of the groove in this region.

In this way, a plurality of defined sealing lines are advantageously realized, at which the seal 100 bears against the inner walls of the groove 10, and moreover a firm fit of the seal 100 in the groove 10 is brought about easily. This means that the first sealing limb 101 in the non-mounted state is only sectionally larger (wider: oversize O3 perpendicular to the first groove limb 11, greater than the width B1; higher: oversize O2 parallel to the first sealing limb, greater than the dimension S2) than the first groove limb 11. Preferably, the second sealing limb 102 in the non-mounted state is also only sectionally larger (oversize O1 compared with the dimension S3) than S3 and preferably as wide as or even particularly preferably shorter (more than 1 mm undersize compared with the dimension B2) than the width B2 of the second groove limb 12. Precisely the last-mentioned measure results in good sealing in the groove limb 12 and in planar termination to the faces 8 and 9 at the space 4.

In its region with which it engages in the lower portion of the groove limb 11, which is located in each case beneath the groove limb 12 in FIGS. 1-2 and 4, the first sealing limb 101 preferably forms the sealing foot 103 with which the seal is positioned in the groove 10 and is held securely in the gap 3. Therefore, the sealing foot 103 is also inserted into the groove limb 11 with the oversizes O2, O3. The first sealing limb 101, in particular the sealing foot 103, has in each case a constriction in the manner of a groove or channel 104, 105, 106 extending perpendicularly to the image plane or to the cross-section in each case at one, two, or particularly advantageously at three of its three outer faces 103*a, b, c* that face the inner walls of the first groove limb 11 of the groove 10.

These channels 104, 105, 106 (cf. FIGS. 1 and 3) are dimensioned such that, even in the state in which the sealing foot 103 has been inserted into the groove limb 101, a spacing, preferably a spacing >0.1 mm, still exists in each case between the seal 100 or the sealing foot 103 thereof and the respectively associated inner wall of the groove 10 in each case in the region of the channel 104, 105, 106. The sealing channel 104 extends, in the inserted state, as far as a corner region between the two groove limbs 11, 12. It is preferably rounder in cross-section.

The further, lower sealing channel 105 is located approximately in the middle above the groove bottom of the groove limb 11. It too is preferably rounder in cross-section. The third sealing channel 106 is configured in a more polygonal manner. All this contributes optionally toward a good fit of the seal 100 and toward a good sealing action. Furthermore, the channels provide space for the necessary deformation of the seal upon insertion into the groove 10.

The first sealing limb 101—see FIG. 4—has, in a state in which it has not yet been inserted into the first longitudinal limb of the groove 10, an oversize O3 perpendicular to the first longitudinal limb 11 of the groove 10 and parallel to the plane of the groove 10 (i.e., in the region of the sealing foot 103). This results in compression during insertion.

Preferably, one or more corner edges of the sealing foot 103 are beveled or formed in the manner of a chamfer 107, 108. These chamfers 107, 108 are dimensioned such that they do not touch the corresponding inner corner edge of the groove 10 in the state inserted into the groove 10. This also means that the region of the oversize O3 of the sealing foot is formed and provided preferably far enough above the groove bottom 11*a* of the longitudinal limb, and that the oversize O3 is dimensioned such that corresponding channels remain at the groove foot in the region of the corners of the groove 10 even in the inserted state. In addition, the region of the oversize O3 of the sealing foot is preferably formed and provided far enough beneath the groove bottom 12*a* of the transverse limb 12 of the groove 10 and the oversize O3 is dimensioned such that a channel 104 also remains in the corner region between the longitudinal limbs 11 and 12.

Preferably, one or more corner edges of the sealing foot 103 are beveled or formed in the manner of a chamfer 107, 108. These chamfers 107, 108 are dimensioned such that they do not touch the corresponding inner corner edge of the groove 10 in the state inserted into the groove 10, such that small channels 113, 114 are also or have also been formed in these corner regions, the small channels 113, 114 preferably having a much smaller cross-section (by more than 50%) than the channels 104, 105, 106, however, in order to ensure a good sealing action.

At the groove limb 11, a beveled edge 15 is formed in the transition to the gap 3, the beveled edge 15 forming a kind of undercut 16 at the gap 3. In the inserted state of the seal 100 into the groove, a bead 115 of the seal extends into this undercut, the bead 115 being formed only as a result of the compression of the seal upon insertion into the groove or upon closing of the groove 10 with the component 1 from the region with the oversize O2.

Above the sealing foot 103, a sealing region 110 having a sealing face 109*a, b* is formed on the sealing limbs 101, 102. The sealing region 110 is compressed upon insertion into the gap 3. The sealing face 109*a, b* rests, in the installed state, against the boundary face 5 of the first component 1 opposite the groove 10 and seals the gap 3 well in this way. Toward the edge 7 of the gap 3 or space 4, the sealing region 110 has, in the region of the sealing limb 102, a peripheral face 111. This peripheral face 111 is preferably designed such that a substantially planar, fitting and smooth transition between the faces of the components 1, 2, which extend at an angle, in this case perpendicularly, to the gap plane 3, and the peripheral face 111 arises. As a result of the pressing of the sealing face 109*b*, on account of the present oversize O1 in this region, the peripheral face 111 of the sealing limb 102 is pushed in the direction of the space 4 such that a peripheral face 111 that is flush with the faces 8 and 9 results, without soiled corners or gaps forming. This peripheral face 111 meets the requirement of cleanability, sterilization or disinfection. This is not possible when a protrusion, in particular a relatively high protrusion, is formed in the groove limb 12, as is the case (unlike here) in the prior art mentioned at the beginning. In this way, caking of contaminants can likewise be prevented very well.

Optionally, the seal 100 also has a further channel 112 in the sealing face 109*a, b* at the gap 3, the further channel 112 extending perpendicularly to the cross-section (of FIG. 3). This further channel 112 is again dimensioned such that, even in the state in which the seal 100 has been inserted into the groove 10 at the gap 3 and the sealing foot 103 has been inserted into the groove limb 11 and clamped in place, a spacing between the seal 100 and the boundary face 5 of the other component 1 exists in the region of the channel 112. As a result, the sealing face 109a, b is divided into two sealing regions.

The seal 100 can be in the form of an extruded profile which is able to be wound up on rolls, such that portions with a desired length can be cut off the seal profile. The seal 100 can also be designed as a circumferentially closed ring profile (sealing ring), however.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE SIGNS

Components 1, 2
Gap 3
Space 4
Boundary faces 5, 6
Peripheral faces 7
Faces 8, 9
Groove 10
Groove limb 11, 12
Groove bottom 11a, 12a
Chamfers 13, 14
Edge 15
Undercut 16
Seal 100
First sealing limb 101
Second sealing limb 102
Foot region 103
Outer faces 103a, b, c
Channels 104, 105, 106
Chamfers 107, 108
Sealing face 109a, b
Sealing region 110
Peripheral face 111
Channels 112, 113, 114
Bead 115
Gap depth 51
Groove-limb depths S2, S3
Groove-limb width B1, B2
Oversize O1, O2, O3

The invention claimed is:

1. A seal arrangement for a process device or plant, the seal arrangement comprising:
a component arrangement with two components that sectionally adjoin one another in a region of a gap, wherein a groove is formed on one of the two components in a direction of the gap, the groove has an L-shape and is open toward an edge of the gap, wherein a first groove limb of the groove extends perpendicularly to a plane of the gap, and wherein a further groove limb of the groove is oriented perpendicularly to the first groove limb, which is formed so as to be open toward the space,
wherein the first groove limb has a first groove-limb depth perpendicular to the gap, the further groove limb has a further groove-limb depth, and the first groove limb has a first groove limb width,
wherein a seal is inserted into the groove, the seal having an L-shape corresponding to the L-shape of the groove, and the seal having has a first sealing limb and a second sealing limb perpendicular thereto, wherein the first sealing limb has a sealing foot,
wherein the first sealing limb is configured such that it is inserted into the first groove limb, and the second sealing limb is configured such that it is insertable into the second groove limb and clamped tightly in the second groove limb,
wherein, in a non-inserted state, portions of the second sealing limb have greater depth than the further groove-limb depth, the first sealing limb has a larger depth than the first groove-limb depth, and the sealing foot of the first sealing limb is wider than the first groove limb width seal has an oversize relative to dimensions of the groove and is inserted into the groove and tightly clamped therein,
wherein, in each case, one channel, extending perpendicularly to a cross-section of the seal along a respective wall of the first sealing limb groove, is formed at least on three outer faces of the first sealing limb that face the walls of the groove in an inserted and compressed state of the seal in the groove, and the one or more channels are dimensioned such that, even in a state in which the sealing foot is inserted into the groove limb, a spacing still exists in a region of the channel in each case between the seal and the respectively associated wall of the groove,
wherein at least two of these channels are formed in a region of the first longitudinal limb and extend approximately centrally in a region of the respective groove wall of this longitudinal limb, and
wherein, above the sealing foot, a sealing region is formed having a peripheral face facing the edge of the gap, wherein the peripheral face is configured such that a substantially planar transition is formed between peripheral faces of the components, which extend at an angle to a plane of the gap, and the peripheral face.

2. The seal arrangement of claim 1, wherein the sealing region further comprises a sealing face bearing, in a sealing manner, against a boundary face of the first component with the gap.

3. The seal arrangement of claim 2, wherein the sealing face has a channel dimensioned such that, even in a state in which the seal is inserted into the gap, a spacing between the seal and the boundary face of the other component exists in the region of the channel.

4. The seal arrangement of claim 1, wherein on both sides of each of the channels, there is direct abutment of an associated seal outer face against an associated inner wall of the respective component.

5. The seal arrangement of claim 1, wherein one or more corner edges of the sealing foot are formed in a beveled manner and form chamfers, wherein the chamfers are dimensioned such that they do not touch a corresponding corner edge of the groove.

6. The seal arrangement of claim 1, wherein the seal is an extruded profile or as a circumferentially closed ring profile.

7. The seal arrangement of claim 1, wherein the seal consists of an elastomer.

\* \* \* \* \*